United States Patent [19]

Delpretti

[11] Patent Number: 4,773,030

[45] Date of Patent: Sep. 20, 1988

[54] METHOD AND APPARATUS FOR DETERMINING THE DEVIATION OF AN ELECTRODE WIRE IN A TRAVELLING WIRE EDM APPARATUS

[75] Inventor: Roger Delpretti, Vernier, Switzerland

[73] Assignee: Charmilles Technologies S.A., Geneva, Switzerland

[21] Appl. No.: 844,802

[22] Filed: Mar. 27, 1986

[30] Foreign Application Priority Data

Mar. 28, 1985 [CH] Switzerland .......................... 1366/85

[51] Int. Cl.$^4$ .......................... G06G 7/66; B23H 7/06; B23H 7/32

[52] U.S. Cl. .................................. 364/562; 219/69 C; 219/69 M; 364/139

[58] Field of Search ............... 364/560, 561, 562, 139; 219/69 M, 69 C, 69 W

[56] References Cited

U.S. PATENT DOCUMENTS

| | | | |
|---|---|---|---|
| 4,499,359 | 2/1985 | Obara ................. | 219/69 M |
| 4,518,842 | 5/1985 | Obara ................. | 219/69 M |
| 4,520,253 | 5/1985 | Gamo et al. ........ | 219/69 W |
| 4,521,662 | 6/1985 | Kinoshita et al. .. | 219/69 M |
| 4,546,227 | 10/1985 | Gamo et al. ...... | 219/69 M |
| 4,622,450 | 11/1986 | Kinoshita et al. . | 219/69 W |
| 4,623,772 | 11/1986 | Fery et al. ......... | 219/69 M |
| 4,659,893 | 4/1987 | Martin .............. | 219/69 M |

FOREIGN PATENT DOCUMENTS 657553 9/1986 Switzerland .

Primary Examiner—Felix D. Gruber
Attorney, Agent, or Firm—Gifford, Groh, VanOphem, Sheridan, Sprinkle and Dolgorukov

[57] ABSTRACT

A method and apparatus for determining the amount of deflection, or curvature height, of an electrode wire during machining of a workpiece by the electrode wire in a travelling wire EDM apparatus. A parametr affecting the curvature height of the electrode wire is varied from a first value to a second value and the resulting variation $\Delta f$ of the curvature height is measured. The measuring is effected by determining the difference between the length of the path travelled by the wire guide members and the length of the path travelled by the active portion of the wire. The ratio between the curvature height of the wire and the inverse of the relative variation of the parameter is subsequently determined. Preferably, a parameter independent of the machining speed is selected, such as the force of longitudinal traction exerted on the wire or the distance separating the two wire guide members.

12 Claims, 2 Drawing Sheets

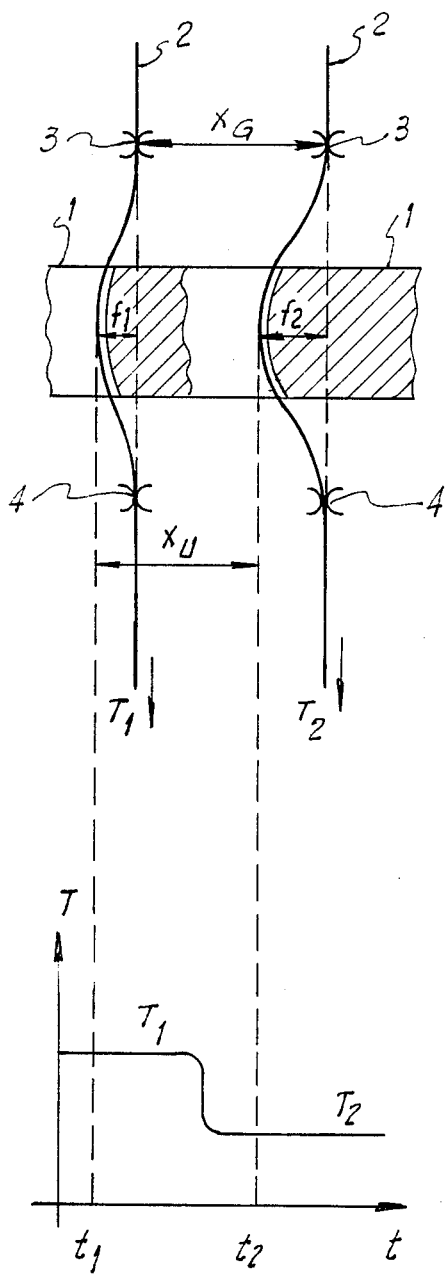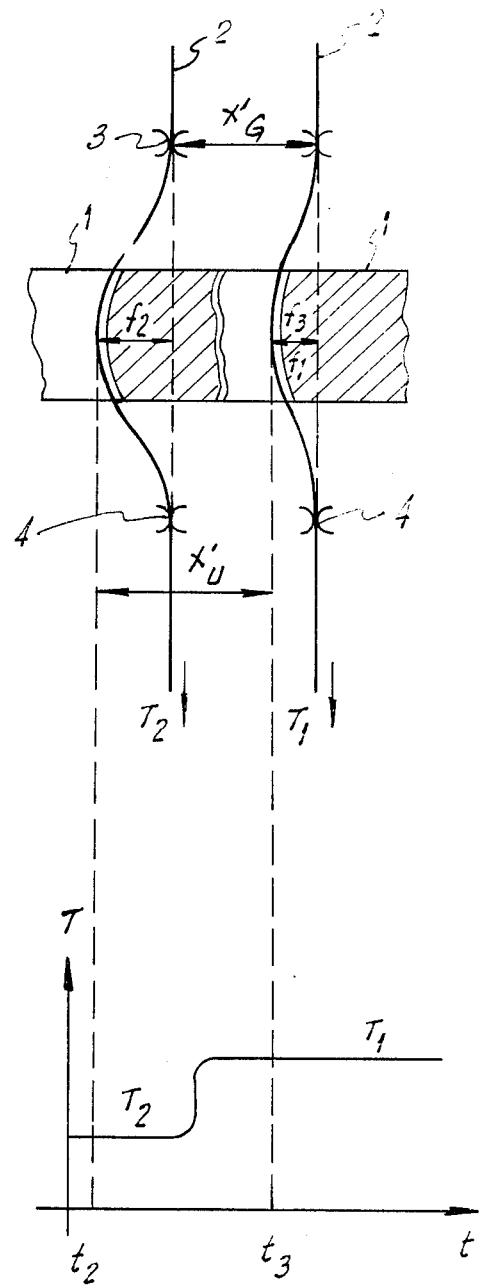
FIG. 1a
FIG. 1b

METHOD AND APPARATUS FOR DETERMINING THE DEVIATION OF AN ELECTRODE WIRE IN A TRAVELLING WIRE EDM APPARATUS

BACKGROUND OF THE INVENTION

The present invention relates to a method and apparatus for determining the amount of deviation, or arc of bending, of an electrode wire stretched and being longitudinally displaced between two guide members, in the course of a cut being effected in an electrode workpiece by electro-erosive discharges.

In the course of cutting a workpiece in a travelling wire EDM apparatus, the electrode wire, whose diameter is of the order of 0.25 mm., for example, is subjected to forces of repulsion and attraction which cause the portion of the wire in the machining zone to adopt a curvilinear shape instead of an ideal rectilinear shape. The forces of repulsion result from the gases being released by the electrical discharges, and the forces of attraction, electro-magnetic and electro-static, are caused respectively by the current and the voltage of the machining pulses. While effecting a cut, the forces of repulsion are paramount and the electrode wire tends to lose its alignment with its guide members until the wire takes a curved shape resulting from an equilibrium between the forces acting on the wire and the longitudinal pull due to the mechanical tension exerted on the wire by the wire feeding mechanism.

It is known that the deflection of the wire between its guide members causes important machining errors, because every time the direction of the cut is changed, the curved portion of the wire lagging behind a straight line connecting the guide members follows a trajectory having a shorter path than the guide member trajectory. It is therefore very important to determine the amount of curvature of the wire, and more particularly the vertex length or height of the arc of curvature of the wire such as to apply known method for correcting, for example by slowing down the machining speed or by modifying the guide member trajectory.

A known method for measuring the amount of deviation of the wire, as disclosed in U.S. Pat. No. 4,521,662, consists in directly measuring, by optical or electrical means, the amount of deviation of the wire relative to its ideal rectilinear shape. The measuring is effected between the surface of the workpiece and one of the guide members. However, the method is complicated and utilizes a cumbersome device located in a portion of the EDM apparatus where room is limited, more particularly when the guide members are very close to the workpiece, which is generally the case as it is desirable to locate each of the wire members in close proximity to the workpiece, in order to limit the amount of bending of the wire between the guide members.

SUMMARY OF THE INVENTION

The principal object of the invention is to provide a method and apparatus overcoming the inconveniences of the prior art and which utilizes for measuring the deviation of the electrode wire of a travelling wire EDM apparatus only electrical and mechanical magnitudes which can be obtained without requiring measuring devices in close proximity ot the machining zone, thus presenting considerable advantages.

The many advantages and objects of the present invention will become apparent to those skilled in the art upon reading in conjunction with the accompanying drawing, the following description of the best mode contemplated at the present for practicing the invention.

BRIEF DESCRIPTION OF THE DRAWING

FIGS. 1a and 1b are schematic diagrams useful in explaining the principle of the method of the invention.

DETAILED DESCRIPTION OF THE PREFERRED EMBODIMENT

Figure 2:
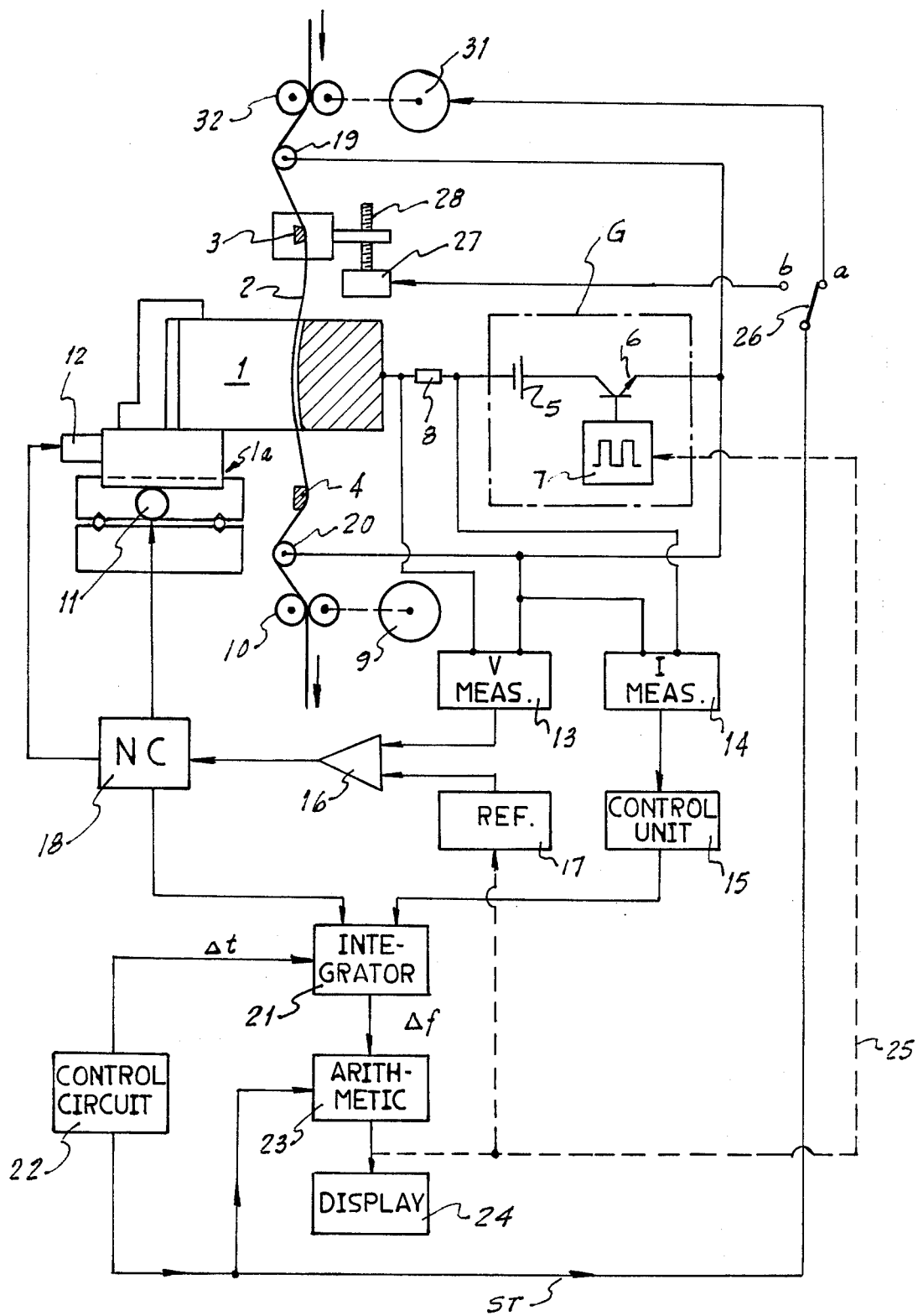
FIG. 2 is an example of functional schematic of an EDM apparatus for practicing the method of the invention.

In the course of cutting a workpiece 1, FIGS. 1a--FIG. 1b, by means of a travelling electrode wire 2, under given electrical discharge machining conditions, the amount of deviation f of the electrode wire 2 during force equilibrium, and the traction T exerted longitudinally on the electrode wire 2 for feeding the wire longitudinally between the guide members 3 and 4 are interrelated according to the following equation:

$$f = (1/T)K \qquad (1)$$

wherein f is the distance hereinafter referred to as "vertex height" or "height" between the chord or a straight line joining the guide members, shown in dash line, and the point on the arc of curvature of the wire most distant from the chord, and K is a constant depending upon the machining conditions.

The value of the constant K can be determined if difference $\Delta f$ is known, difference $\Delta f$ being the difference between the heights f1 and f2 resulting from the curvature taken by the wire 2 during equilibrium machining conditions when the wire is subjected to a traction T1 at a moment t1, and subsequently to another traction T2 at another moment t2, FIG. 1. The constant K is obtained from equation (1) which then becomes:

$$K = \frac{f2 - f1}{T1 - T2} \cdot T2T1. \qquad (2)$$

The tractions T1 and T2 exerted on the wire can be measured either directly or indirectly, while the difference (f2−f1) can be obtained by integration, between the times t1 and t2, of the difference between the speeds of feed of the guide members and the machining speed, the latter being a function of the machining current. Such a method is described in detail in Swiss patent application No. 3476/84-9 now Swiss Pat. No. CH 657553-AS. The constant K being thus determined under given machining conditions by way of the equation (2); equation (1) permits thus to obtain the value of the wire curvature height f directly from the traction T exerted on the wire.

The determination of the value of the constant K can be simplified by effecting two variations in opposite directions of the traction exerted on the wire as schematically illustrated at FIG. 1a, where there is schematically and diagramatically represented the deflection of the electrode wire 2 while effecting a cut in the workpiece 1. The traction exerted on the wire 2 is changed from a first value T1 at time t1 to a second value T2 at time t2. The traction exerted on the wire is returned to the value T1 at time t3, FIG. 1b, chosen such that the machining path between times t2 and t3 is of the same length as the machining path between times t1 and t2. This can be accomplished preferably by maintaining the machining speed constant and in choosing:

$$t2-t1=t3-t2 \quad (3)$$

Under those conditions, if $x_U$, is the length of the machining path between the times t1 and t2, and $x_G$ is the length of travel of the guide members during the same time period, while $x'_U$ and $x'_G$ designate corresponding magnitudes during the time period from t2 to t3, the change of the value of the curvature height of the wire during the first time period is given by $$f2-f1=x_G-x_U \quad (4)$$

and during the second time period by $$f3-f2=x'_G-x_U \quad (5)$$

In those equations f1, f2 and f3 are the curvature heights of the wire at times t1, t2 and t3. If precautions are taken to have the lengths of the machining path $x_U$ and $x'_U$ be equal, for example by maintaining the machining speed constant and, in addition, ensuring that the curvature height f3 at the end of the second time period is equal to the curvature height f1 at the beginning of the first time period after substituting in equation (5) f1 for f3 and $x_U$ for $x'_U$, subtracting equation (4) from equation (5) provides:

$$f2-f1-(f1-f2)=x_G-x_U-(x'_G-x_U), \text{ or}$$

$$f2-f1-f1+f2=x_G-x_U-x'_G+x_U, \text{ or}$$

$$2(f2-f1)=x_G-x'_G, \text{ or}$$

$$(f2-f1)=\tfrac{1}{2}(x_G-x'_G) \quad (6)$$

By carrying the value of the difference between the wire curvature heights f1 and f2 as a function of the difference of travel $x_G-x'_G$ of the guide members into equation (2), the value of the constant K of equation (1) is obtained. Consequently, under predetermined machining conditions the amount of deviation or curvature height of the wire is obtained solely as a function of the traction exerted on the wire.

For example, for a traction T2 exerted on the wire it is to be noted that, by reference to equations (1) and (2), the curvature height of the wire is proportional to the quotient of the variation of the curvature height of the wire by the relative difference between the traction forces having caused the variation of the curvature height. The ratio between the curvature height and the inverse of the relative difference of the forces of traction is thus equal to the ratio between the corresponding difference of the curvature height which is obtained by way of equations (4) or (6) and said traction T2.

Another manner for varying the curvature height of the wire without changing the machining speed consists in changing the distance between the two wire guides. Under such conditions, the traction exerted on the wire remains constant and the difference between the corresponding curvature heights can be obtained via equation (4) if a single variation of the distance is effected, or via equation (6) upon return to the original distance between the guide members.

FIG. 2 is a schematic representation of an EDM apparatus for practicing the invention. The apparatus is adapted to effectuate by electrical discharges a cut in the electrode workpiece 1 by means of the electrode wire 2. The electrode wire 2 is held under tension between the two guide members 3 and 4 and is constantly displaced longitudinally such as to constantly renew the active portion of the wire 2 in the machining zone defined between the workpiece 1 and the wire 2. The wire 2 is continuously fed downwardly, in the example of structure illustrated, by a feeding mechanism consisting, for example, of a pair of pinch rollers 10, one of which is driven by an electric motor 9. The workpiece 1 is clamped on a cross-slide table 1a which is capable of being displaced along two orthogonal axes by way of a pair of servo motors 11 and 12. As is well known, the machining zone between the active portion of the wire 2 and the workpiece 1 is submerged in a dielectric fluid or, alternatively, a dielectric fluid is supplied to the machining zone by appropriate nozzles, not shown. Machining electrical pulses are supplied by a power generator G connected across the workpiece 1 ad the electrode wire 2. The power generator G comprises, as is well knwon to those skilled in the art of EDM technology, a DC power supply 5 and a switch 6 which may take the form, as illustrated, of one or more power transistors 6 whose base is connected to a frequency generator 7, such as a multivibrator, for example. One terminal of the generator G is connected to the workpiece 1 through a current limiting resistor 8 and the other terminal is connected to a pair of contact members 19 and 20, one above the workpiece 1, and the other below, in the example of structure illustrated, which are in electrical engagement with the electrode wire 2. A voltage measuring circuit 13 is connected across the contacts 19-20 and the workpiece 1 for measuring the gap voltage across the machining zone. A current measuring circuit 14 is connected across the resistor 8 and the contacts 19-20 to measure the useful machining current as a function of the voltage drop across the resistor 8.

The current measuring circuit 14 provides at its output a signal proportional to the machining current and applies that signal to a control circuit 15 which, as is known in the art, provides a signal indicative of the machining speed as a function of the machining current and other instantaneous conditions of machining. The signal at the output of the gap voltage measuring circuit 13 is compared in a comparator 16 with a reference signal obtained from a reference value source 17. The comparator 16 provides at its output a signal which is the difference between the machining voltage and the voltage reference value, and that signal at the output of the comparator 16 is applied to an input of a numerical control unit 18. As is also well known, the numerical control unit 18 processes the data of the programmed cutting path into command signals applied to the cross-table servo motors 11 and 12, such as to displace the workpiece 1 relative to the electrode wire 2 according to a predetermined path. The program data is constantly corrected in real time as a function of the signal at the output of the comparator 16 such that the speed of transverse feed of the electrode wire 2 into the workpiece 1 is adjusted as a function of the difference between the machining voltage and the reference signal from the voltage reference 17. A signal is also provided by the numerical control unit 18 which is applied to an input of an integrator circuit 21, that signal being representative of the speed of the guide members 3 and 4 and being applied to an input of circuit 21. The signal at the output of the control circuit 15, which is representative of the machining speed, is applied to another input of the integrator circuit 21. The integrator circuit 21 is arranged to calculate the integral of the difference between those two speeds during a the interval $\Delta t$ whose beginning and end are determined by a signal obtained from a command circuit 22, which may take the form of a flip-flop or a clock. The integrator circuit 21 thus provides at its output a signal which is representative of the variation $\Delta f$ of the amount of deviation or curvature height of the electrode wire 2 during the time interval $\Delta t$. The output signal from the integrator circuit 21 is applied to an input of an arithmetic circuit 23 whose other input receives a signal $S_T$ that commands either the tension force T exerted on the electrode wire 2 or the distance separating the guide members 3 and 4, said signal $S_T$ is also emitted by the control circuit 22. From the signals received from the beginning to the end of a predetermined time interval, the arithmetic circuit 23 calculates the curvature height f of the wire 2 by means of equations (1) and (2) and displays the value thus obtained on a display unit 24. In addition, the signal representing the value of the curvature height f can be applied via an optional feedback line 25, shown in dashed line, either to the multivibrator 7 or to the voltage reference source 17. In this manner, either the form or the frequency of the pulses, or yet the reference voltage can be modified, so as to maintain the value of the curvature length or amount of deflection, of the wire 2 within predetermined limits.

The signal $S_T$, provided at the output of the control circuit 22, which acts on the parameter representing the curvature height of the wire 2 is also applied to the movable contact of a bi-polar switch 26 which permits to apply the signal $S_T$ to a terminal a of the switch 26, or to another terminal b, allowing two different operation modes according to whether it is desired to vary the curvature height of the electrode wire 2 by varying the traction force exerted on the wire 2, or by varying the distance separating the guide members 3 and 4 that support and guide the electrode wire 2. The force of traction exerted on the electrode wire 2 results in a force directed transversely to the axis of the wire 2 which urges the wire 2 towards the frontal surface of the cut in the workpiece 1. Assuming equal forces of traction, a variation of the distance between the wire guide members 3 and 4 causes a resulting variation of the curvature height of the wire 2 and, if the mechanism providing the longitudinal motion of the wire 2 includes, as is often the case, appropriate elements ensuring that a constant longitudinal traction force is exerted on the wire 2, the curvature height of the wire 2 can be varied simply by varying the distance between the guide members 3 and 4.

For that purpose, a servo motor 27 is provided which is controlled by the signal $S_T$ when the movable contact of the switch 26 is engaged with the contact b, for displacing vertically the upper guide member 3 by way of a screwjack 28, in response to the command signal $S_T$ provided by the control circuit 22.

In order to modify the transverse force applied on the wire 2 resulting from the longitudinal tension force, a braking motor 31 is provided for acting on a pair of pinch rollers 32 between which the wire 2 is passed, for example, upstream of the contact 19 and upper guide member 3. The pinch rollers 32 apply on the wire 2 a braking torque depending upon the value of the signal $S_T$ applied to the motor 31 from the control circuit 22 when the movable contact of the switch 26 is engaged with the contact a. It will be readily appreciated that both a variation of the distance separating the guide members 3 and 4 and the braking force exerted on the wire 2 may be used, in which case the output signal $S_T$ from the control circuit 22 is applied simultaneously to the servo motor 27 and the braking motor 31.

In operation, the current measuring circuit 14, which is conventional in construction, provides an output signal to the control unit 15 representative of the instantaneous value of the machining current. The value of this instantaneous current is electrically connected through a control unit 15 to one input of an integrator 21.

The integrator 21 also receives an input from the numerical control circuit 18 which is indicative of the actual speed of the workpiece, and thus of the machining operation, is also provided as an input signal to the integrator 21.

A control circuit 22 generates two output signals, $\Delta t$ and $S_T$. The output $\Delta t$ is fed as an input to the integrator 21 and, is used to turn the integrator 21 on and off. When this signal $\Delta t$ is active, the integrator 21 integrates the difference between its inputs from the control unit 15 and a numerical control circuit 18 and generates an output signal representative thereof to the arithmetic unit 23. Consequently, the output signal from the integrator 21 is representative of the difference between the actual machining speed, as determined by the change in machining current from the control unit 15, and the speed of the machining table from the numerical control circuit 18.

The control circuit 22 also generates the control signal $S_T$ which either increases the tension on the machining wire 2 or the position of the supports 3 and 4 (dependent upon the position of the switch 26) in the previously described fashion. This signal $S_T$ is also provided to the arithmetic unit 23 as an input signal of both the beginning and the end of the signal $S_T$.

The arithmetic unit 23 then calculates the curvature height of the electrode wire in accordance with equations 1 and 2 set forth in this patent specification. This value is then displayed, for example, on the display unit 24.

Having thus described the present invention by way of examples of the method of the invention and of apparatus for practicing the invention, modifications whereof will be apparent to those skilled in the art, what is claimed as new is as follows:

I claim:

1. In an electric discharge machine, a method for controlling the electric discharge machining operation by determining the curvature height of an electrode wire stretched between two guide members in a travelling wire EDM apparatus for effecting a cut by electrical discharges on a workpiece by means of said electrode wire, said method comprising varying a parameter acting on the curvature height of said wire such as to determine a function of the curvature height of the wire to the inverse of said parameter, utilizing said function to control a parameter in an EDM process.

2. The method of claim 1 wherein said function is obtained by sequentially giving to said parameter two different values and determining the variation $\Delta f$ of the curvature height of the wire while passing from the first value to the second value of said parameter.

3. The method of claim 2 wherein the variation $\Delta f$ is obtained by measuring the difference between the length of the path of the wire guide members and the length of the cut path while passing from said first value to said second value.

4. The method of claim 3 wherein the variation of the curvature height of the wire is effected by varying the force of traction exerted upon the wire between the two wire guide members.

5. The method of claim 3 wherein the variation of the curvature height of the wire is effected by varying the distance separating the wire guide members.

6. The method of claim 2 wherein the variation $\Delta f$ is obtained by giving to said parameter a first value and a second value respectively at the beginning and at the end of a first time interval, subsequently giving to said parameter said second value and said first value respectively at the beginning and at the end of a second time interval equal to said first time interval, and calculating half of the difference between the length of the path travelled by the wire guide members during said first and said second time interval, while maintaining the cutting speed constant.

7. The method of claim 6 wherein the variation of the curvature height of the wire is effected by varying the force of traction exerted upon the wire between the two wire guide members.

8. The method of claim 6 wherein the variation of the curvature height of the wire is effected by varying the distance separating the wire guide members.

9. The method of claim 2 wherein the variation of the curvature height of the wire is effected by varying the force of traction exerted upon the wire between the two wire guide members.

10. The method of claim 2 wherein the variation of the curvature height of the wire is effected by varying the distance separating the wire guide members.

11. An apparatus for determining the curvature height of an electrode wire stretched between two wire guide members in a travelling wire EDM apparatus for cutting a workpiece by means of said electrode wire, said apparatus comprising a numerical control unit for controlling the relative displacement between the workpiece and the wire guide members, first control means adjustng the speed of said relative displacement such as to maintain a machining gap in a machining zone between said electrode wire and said workpiece at a predetermined value, second control means varying a parameter representing the curvature height of said wire and providing signals representative of said parameter, means for determining the machining speed and the speed of relative displacement between the workpiece and the wire guide members and for supplying signals representative thereof, and an arithmetic circuit for determining the curvature height of said wire as a function of said last mentioned signals and of the signals provided by said control means in accordance with the following equations:

$$f = \frac{1}{T} \cdot k \text{ (or: } f = k/T\text{)}$$
$$k = \frac{f_2 - f_1}{T_1 - T_2} \cdot T_2 T_1$$

where
T = traction force
f = vertex height
k = constant
and the subscripts denote two separate times.

12. In an electric discharge machine, a method for controlling the electric discharge machining operation by determining the curvature height of electrode wire stretched between two wire guide members in a travelling wire EDM apparatus for cutting a workpiece by means of the electrode wire, said method comprising the steps of
controlling the relative displacement between the workpiece and the wire guide members,
adjusting the speed of the relative displacement such as to maintain a machining gap in a machining zone between the electrode wire and the workpiece at a predetermined value,
varying a parameter representing the curvature height of the wire and providing first signals representative of said parameter,
determining the machining speed and the speed of relative displacement between the workpiece and the wire guide members and generating second signals representative thereof,
determining the curvature height of the wire as a function of said first and second signals in accordance with the following equation:

$$f = \frac{1}{T} k; \text{ and}$$
$$k = \frac{f_2 - f_1}{T_1 - T_2} \cdot T_2 T_1$$

where
T = traction force
f = vertex height
k = constant
and the subscripts denote two separate times.

* * * * *